United States Patent
Adler

(10) Patent No.: US 9,207,121 B2
(45) Date of Patent: Dec. 8, 2015

(54) CAVITY-ENHANCED FREQUENCY COMB SPECTROSCOPY SYSTEM EMPLOYING A PRISM CAVITY

(71) Applicant: Tiger Optics, LLC, Warrington, PA (US)

(72) Inventor: Florian Adler, Lafayette Hill, PA (US)

(73) Assignee: TIGER OPTICS, LLC, Warrington, PA (US)

( * ) Notice: Subject to any disclaimer, the term of this patent is extended or adjusted under 35 U.S.C. 154(b) by 0 days.

(21) Appl. No.: 14/482,469

(22) Filed: Sep. 10, 2014

(65) Prior Publication Data
US 2015/0070692 A1    Mar. 12, 2015

Related U.S. Application Data

(60) Provisional application No. 61/876,266, filed on Sep. 11, 2013.

(51) Int. Cl.
| | |
|---|---|
| *G01J 3/00* | (2006.01) |
| *G01J 3/42* | (2006.01) |
| *G01J 3/02* | (2006.01) |
| *G01J 3/10* | (2006.01) |
| *G01J 3/433* | (2006.01) |

(52) U.S. Cl.
CPC .. *G01J 3/42* (2013.01); *G01J 3/021* (2013.01); *G01J 3/10* (2013.01); *G01J 3/4338* (2013.01)

(58) Field of Classification Search
CPC ........ G01N 21/3504; G01J 3/021; G01J 3/18; G01J 3/42; G01B 9/02008
See application file for complete search history.

(56) References Cited

U.S. PATENT DOCUMENTS

| | | |
|---|---|---|
| 5,973,864 A | 10/1999 | Lehmann et al. |
| 6,097,555 A | 8/2000 | Lehmann et al. |
| 6,172,823 B1 | 1/2001 | Lehmann et al. |
| 7,538,881 B2 | 5/2009 | Ye et al. |
| 8,564,785 B2 | 10/2013 | Newbury et al. |
| 2008/0074660 A1* | 3/2008 | Ye et al. ................ 356/300 |
| 2011/0261363 A1 | 10/2011 | Picqué et al. |
| 2011/0267625 A1 | 11/2011 | Guelachvili et al. |

OTHER PUBLICATIONS

Of Paul Johnston, "Cavity enhanced absorption spectroscopy using a broadband prism cavity and a supercontinuum source", Sep. 15, 2008.*

(Continued)

*Primary Examiner* — Gregory J Toatley
*Assistant Examiner* — Maurice Smith
(74) *Attorney, Agent, or Firm* — RatnerPrestia

(57) ABSTRACT

Spectroscopy systems and methods of comb-based spectroscopy are provided. A light source generates light corresponding to a frequency comb. A prism cavity is optically coupled to the light source. The prism cavity receives the generated light and produces first and second output light. The first output light is associated with reflection of the received light within the prism cavity. The second output light is associated with transmission of the received light through a prism of the prism cavity. A coupling system is coupled to the light source and the prism cavity. The coupling system adjusts a characteristic of at least one of the light source or the prism cavity, based on at least one of the first output light and the second output light. The characteristic is adjusted to increase optical coupling between the light source and the prism cavity and to compensate for a dispersion of the prism cavity.

20 Claims, 9 Drawing Sheets

(56) References Cited

OTHER PUBLICATIONS

Michael Thorpe "Broadband Cavity Ringdown Spectroscopy for Sensitive and Rapid Molecular Detection", Mar. 17, 2006.*

International Search Report and Written Opinion issued in PCT/US2014/054876 mailed Nov. 19, 2014.

Adler, F., et al., "Cavity-enhanced direct frequency comb spectroscopy: technology and applications," Annual Review of Analytical Chemistry, 3:175-205, 2010.

Avino, S., et al., "Evanescent-wave comb spectroscopy of liquids with strongly dispersive optical fiber cavities," Applied Physics Letters, 102, 201116-1-201116-5, 2013.

Bernhardt, B., et al., "Cavity-enhanced dual-comb spectroscopy," Nature Photonics, 4:55-57, 2010.

Diddams, S.A., et al., "Molecular fingerprinting with the resolved modes of a femtosecond laser frequency comb," Nature, 445:627-630, 2007.

Drever, R.W.P., et al., "Laser phase and frequency stabilization using an optical resonator," Applied Physics B, 31:97-105, 1983.

Foltynowicz, A., et al., "Quantum-noise-limited optical frequency comb spectroscopy," Physical Review Letters, 107:233002-1-233002-5, 2011.

Hansch, T.W., et al., "Laser frequency stabilization by polarization spectroscopy of a reflecting reference cavity," Optics Communications, 35:3;441-444, 1980.

Hinkle, K.H., "Astronomical near-infrared echelle gratings," Proc. SPIE, 9151:91514A-1-91514A-7, 2014.

Lehmann, K.K., et al. "Brewster angle prism retroreflectors for cavity enhanced spectroscopy," Applied Optics, 48:16; 2966-2978, 2009.

Thorpe, M.J., et al., "Cavity-enhanced direct frequency comb spectroscopy," Applied Physics B, 91:397-414, 2008.

Thorpe, M.J., et al., "Precise measurements of optical cavity dispersion and mirror coating properties via femtosecond combs," Optics Express, 13:3; 882-888, 2005.

* cited by examiner

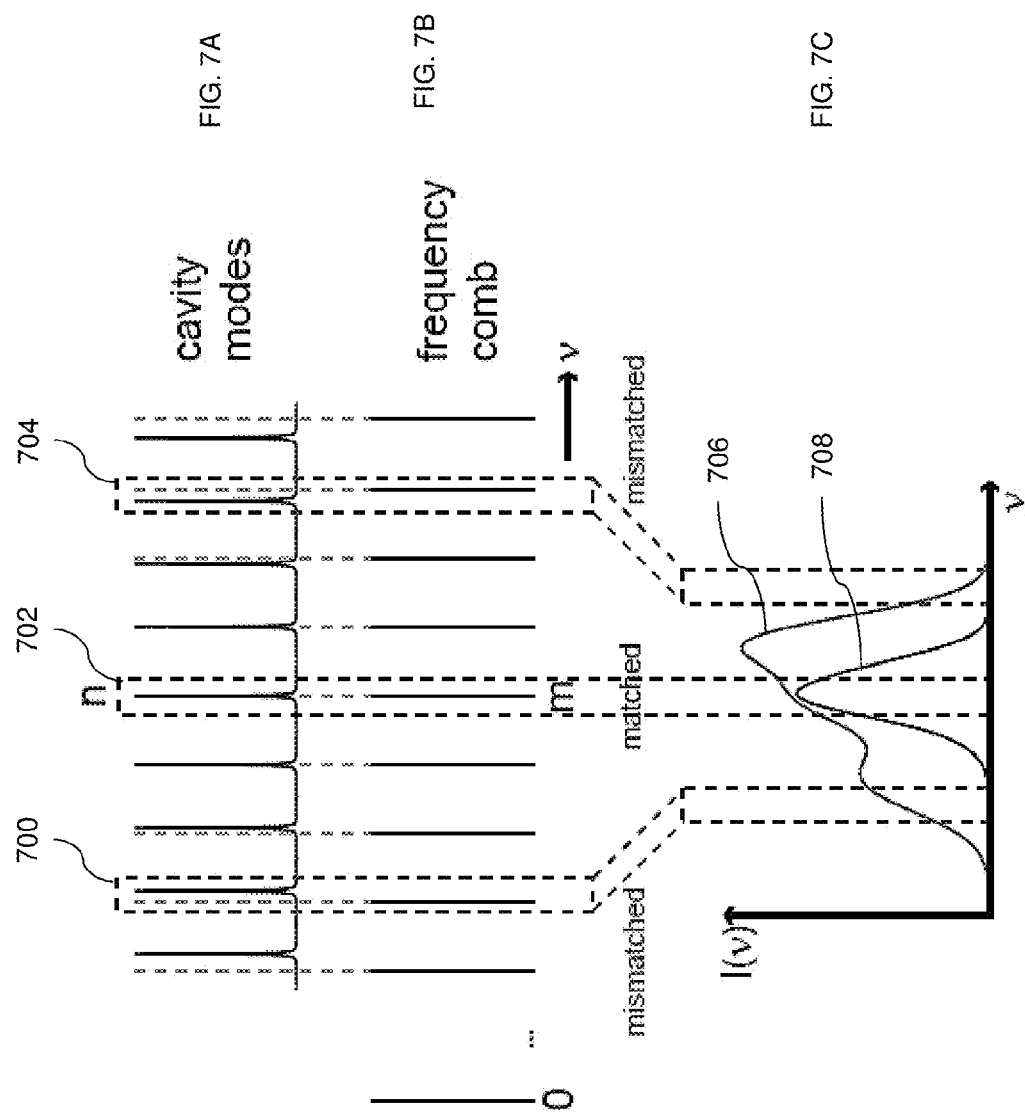

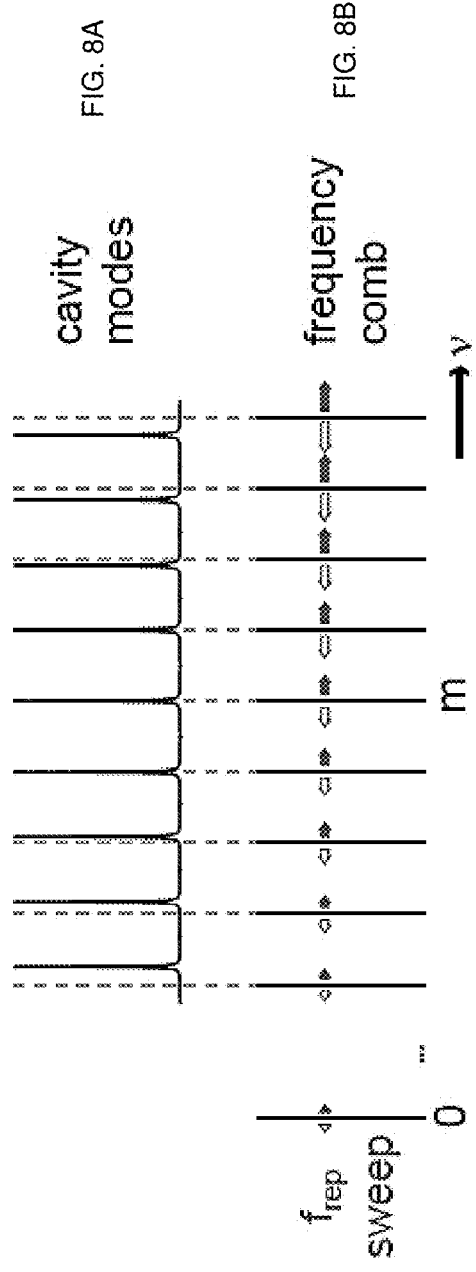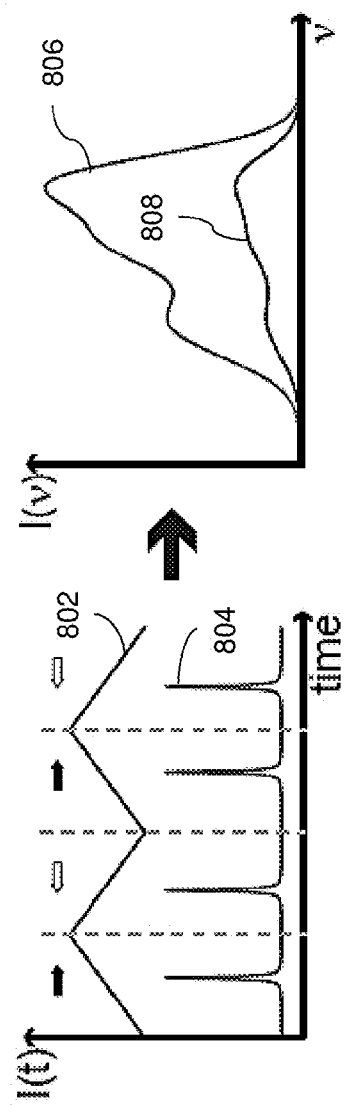

US 9,207,121 B2

CAVITY-ENHANCED FREQUENCY COMB SPECTROSCOPY SYSTEM EMPLOYING A PRISM CAVITY

CROSS-REFERENCE TO RELATED APPLICATIONS

This application is related to and claims the benefit of U.S. Provisional Application No. 61/876,266, entitled CAVITY-ENHANCED FREQUENCY COMB SPECTROSCOPY SYSTEM EMPLOYING A PRISM CAVITY, filed on Sep. 11, 2013, the content of which is incorporated herein by reference.

FIELD OF THE INVENTION

The present invention relates to ultra-broadband and rapid molecular spectroscopy, more specifically to cavity-enhanced frequency comb spectroscopy systems and methods using a high dispersion prism cavity, with high sensitivity for detection of trace levels of molecules.

BACKGROUND OF THE INVENTION

Spectroscopy is the study of the interaction between matter and radiated energy. Spectroscopy is known to be used for many applications in physics, chemistry, biology and the environmental sciences. Some current spectroscopy systems use a frequency comb as a light source. In general, a frequency comb is a light source whose frequency domain spectrum includes a series of discrete, equally spaced elements (frequency lines). In the time domain, the frequency comb emits a train of optical pulses with a carrier frequency and a repetition rate. Frequency comb sources may be useful for spectroscopy applications, because they can provide simultaneous broad spectral coverage (e.g., spectral coverage on the order of hundreds to thousands of frequency comb lines) and high resolution (e.g., an optical resolution typically better than about 10 MHz), broadband measurements of molecular samples.

SUMMARY OF THE INVENTION

The present invention relates to a cavity-enhanced frequency comb spectroscopy system. The system includes a light source, a prism cavity and a coupling system coupled to the light source and the prism cavity. The light source is configured to generate light corresponding to a frequency comb. The prism cavity is optically coupled to the light source. The prism cavity is configured to receive the generated light and to produce first output light and second output light. The first output light is associated with reflection of the received light within the prism cavity. The second output light is associated with transmission of the received light through a prism of the prism cavity. The coupling system is configured to adjust a characteristic of at least one of the light source or the prism cavity, based on at least one of the first output light and the second output light. The characteristic is adjusted to increase optical coupling between the light source and the prism cavity and compensate for a dispersion of the prism cavity.

The present invention also relates to a method of cavity-enhanced comb-based spectroscopy. The method includes generating, by a light source, light corresponding to a frequency comb and directing the generated light to a prism cavity, such that the prism cavity produces first output light and second output light. The first output light is associated with reflection of the generated light within the prism cavity. The second output light is associated with transmission of the generated light through a prism of the prism cavity. The method also includes adjusting a characteristic of at least one of the light source or the prism cavity, based on at least one of the first output light and the second output light. The characteristic is adjusted to increase optical coupling between the light source and the prism cavity and compensate for a dispersion of the prism cavity.

BRIEF DESCRIPTION OF THE DRAWINGS

The invention may be understood from the following detailed description when read in connection with the accompanying drawings. It is emphasized that, according to common practice, various features/elements of the drawings may not be drawn to scale. On the contrary, the dimensions of the various features/elements may be arbitrarily expanded or reduced for clarity. Moreover, in the drawings, common numerical references are used to represent like features/elements. Included in the drawings are the following figures:

FIG. 7A is a graph illustrating an example of prism cavity modes as a function of frequency for a locked coupling scheme, according to an embodiment of the present invention;

FIG. 7B is a graph illustrating an example of frequency comb modes as a function of frequency for a locked coupling scheme, according to an embodiment of the present invention;

FIG. 7C is a graph illustrating an example of a comb frequency domain spectrum and a cavity transmission frequency domain spectrum when a prism cavity mode (FIG. 7A) is locked to a frequency comb mode (FIG. 7B) via electronic locking, according to an embodiment of the present invention;

FIG. 8A is a graph illustrating an example of prism cavity modes as a function of frequency for a swept coupling scheme, according to an embodiment of the present invention;

FIG. 8B is a graph illustrating an example of frequency comb modes as a function of frequency for a swept coupling scheme, according to an embodiment of the present invention;

FIG. 8C is a graph illustrating an example of a frequency comb sweep signal and a prism cavity transmission signal as a function of time for a swept coupling scheme, according to an embodiment of the present invention; and FIG. 8D is a graph illustrating an example of a comb frequency domain spectrum and a cavity transmission frequency domain spectrum of the respective time domain signals shown in FIG. 8C for a swept coupling scheme, according to an embodiment of the present invention.

DETAILED DESCRIPTION OF THE INVENTION

Figure 1:
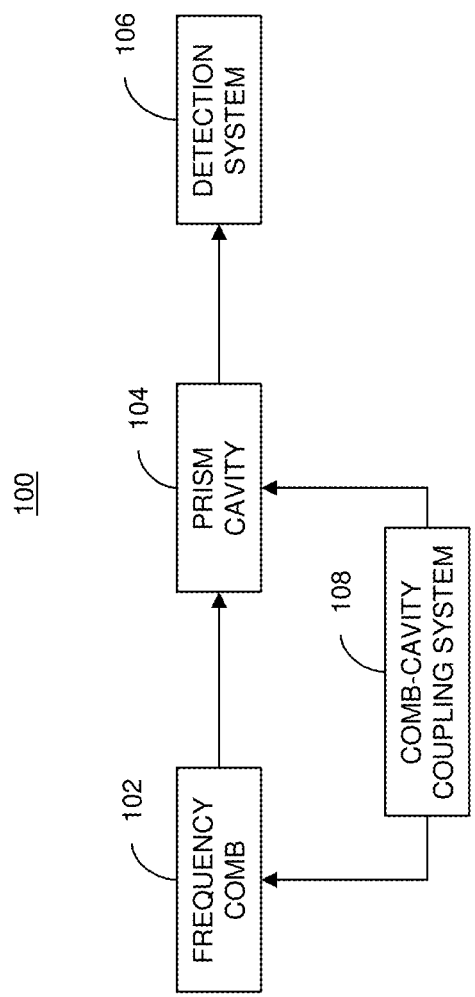
FIG. 1 is a functional block diagram illustrating an example prism cavity-enhanced frequency comb spectroscopy system, according to an embodiment of the present invention.

As discussed above, in recent years, frequency combs have emerged as promising sources for spectroscopic devices due to their combination of wide spectral coverage and high resolution capability. In one configuration, a frequency comb may be used in combination with a high-finesse optical enhancement cavity to increase detection sensitivity. This method is known as cavity-enhanced direct frequency comb spectroscopy (CE-DFCS) and is described in U.S. Pat. No. 7,538,881 to Ye et al. A mirror cavity consisting of two or more highly reflective dielectric mirrors is commonly used for CE-DFCS. The mirrors are typically arranged to form a linear cavity or ring cavity. Reflective dielectric mirrors are typically used in CE-DFCS because: (1) the mirrors are relatively common and commercially available and (2) the mirrors can be manufactured with a focus on low dispersion, thus maximizing frequencies in the optical bandwidth that can be transmitted through the mirror cavity at the same time. Therefore, dielectric mirrors appear to be a reasonable match for the large optical bandwidth available from a frequency comb source. Dielectric mirrors, however, have a limitation regarding their overall transmission bandwidth. The mirror reflectivity can only be optimized for a narrow part of the spectrum, typically much smaller than the maximum available bandwidth from a frequency comb.

In contrast, optical cavities using prisms provide a much wider overall bandwidth in their reflection band compared to mirror cavities. This is because prism cavities are based on optical effects such as total internal reflection and Brewster angles, which are much less dependent to wavelength than optical wave interference, which provides the basis for a dielectric mirror. Optical cavities based on prism retro-reflectors are described in U.S. Pat. Nos. 5,973,864, 6,097,555, and 6,172,823 to Lehmann et al.

Recently, it has been shown that finesse comparable to a mirror cavity can be achieved using prisms. In general, finesse is a measure of the quality of an optical resonator. Finesse may be defined as $FSR/\delta v$, where FSR is the free spectral range (the frequency spacing of resonant modes of the cavity) and $\delta v$ represents the linewidth of the cavity modes. A high finesse optical cavity refers to a resonator capable of being used for the enhancement optical signals, typically for high-sensitivity molecular detection or intensity increase. A high finesse optical cavity is commonly defined as having a ratio $FSR/\delta v$ exceeding about one thousand.

Prism cavities, however, do not appear to be a good match for use with a frequency comb, despite their large overall bandwidth capability. This is because a significant part of the optical beam path lies inside the prism material (e.g., fused silica), causing prism cavities to experience a much higher dispersion than mirror cavities. Thus, the number of simultaneous frequencies in an optical bandwidth that can be coupled into a prism cavity is generally small compared to a mirror cavity. The bandwidth of a prism cavity may vary depending on the dispersion properties of the prism material, the prism size, and the wavelength of interest. Due to their high dispersion properties, prism cavities have not been used in frequency comb based spectroscopy systems thus far. In general, it has been assumed that the large cavity dispersion of prism cavities would be a dramatic shortcoming for use in CE-DFCS systems.

Aspects of the present invention relate to cavity-enhanced frequency comb spectroscopy systems and methods of cavity-enhanced comb-based spectroscopy. An example spectroscopy system includes a light source, a prism cavity and a coupling system coupled to the light source and the prism cavity. The light source (also referred to herein as a frequency comb) is configured to generate light corresponding to a frequency comb. The prism cavity is optically coupled to the light source. The prism cavity is configured to receive the generated light and to produce first output light and second output light. The first output light is associated with reflection of the received light within the prism cavity. The second output light (also referred to herein as an optical error signal) is associated with transmission of the received light through a prism of the prism cavity. In some examples, the first output light is directed to a detector to measure a cavity transmission. The coupling system is configured to adjust a characteristic of at least one of the light source or the prism cavity, based on at least one of the first output light and the second output light. The characteristic is adjusted to increase optical coupling between the light source and the prism cavity and compensate for a dispersion of the prism cavity.

An aspect of the invention makes use of the prism cavity as an optical enhancement cavity for frequency comb spectroscopy. Because of the large overall bandwidth of the prism cavity (which can exceed about 1000 nm in the near infrared region), spectroscopic devices may be produced with an ultra-wide bandwidth (typically spanning about several hundred nanometers in the near infrared region) and very high sensitivity (typically about 2-4 orders of magnitude better than direct detection without an enhancement cavity), despite the high dispersion of the prism cavity. Example systems and methods of the present invention overcome the high dispersion of the prism cavity by optimizing the optical coupling between the frequency comb and the prism cavity. In some examples, the frequency comb line spacing may be adjusted dynamically to the FSR of the prism cavity (or vice versa). In some examples, the frequency comb line spacing may be statically locked to a particular position. In some examples, the detection system may be dispersive (for example, to take advantage of the high overall bandwidth). In some examples, the detection system may include a single channel detector (for example, to take advantage of a spectral filtering capability of the prism cavity that results from the cavity's high dispersion). Furthermore, the dispersion properties of the prism cavity may be used as an advantage for certain applications, such as spectral filtering. For example, the highly dispersive cavity may be configured as a spectral filter, obviating the use of additional band pass filters or a dispersive detection system.

Example prism cavity-enhanced spectroscopy systems of the present invention may be seen as an alternative to current Fourier transform infrared spectrometers or gas chromatographs. Example prism cavity-enhanced spectroscopy systems may be configured for wide bandwidth, multi-species detection, with increased speed and sensitivity compared to presently used techniques. Prism cavity-enhanced spectroscopy systems may be used for applications, including, without being limited to, online process monitoring in chemical manufacturing, chemometrics, spectrophotometry for ultra-low-loss coatings, multi-species spectroscopy, the study of chemical dynamics, etc.

Figure 3:
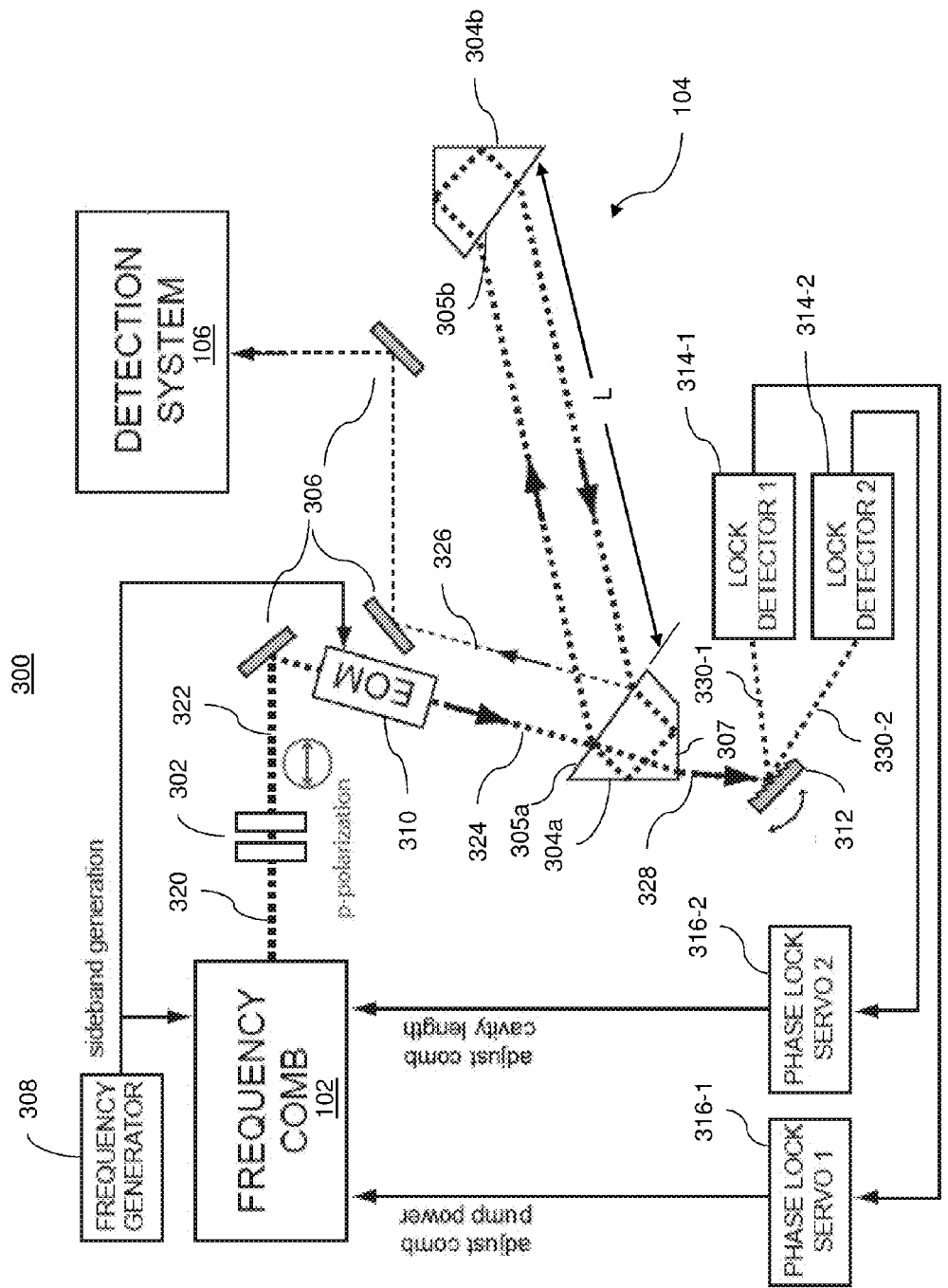
FIG. 3 is a functional block diagram illustrating an example spectroscopy system shown in FIG. 1 having an electronic locking scheme, according to an embodiment of the present invention.
Figure 4:
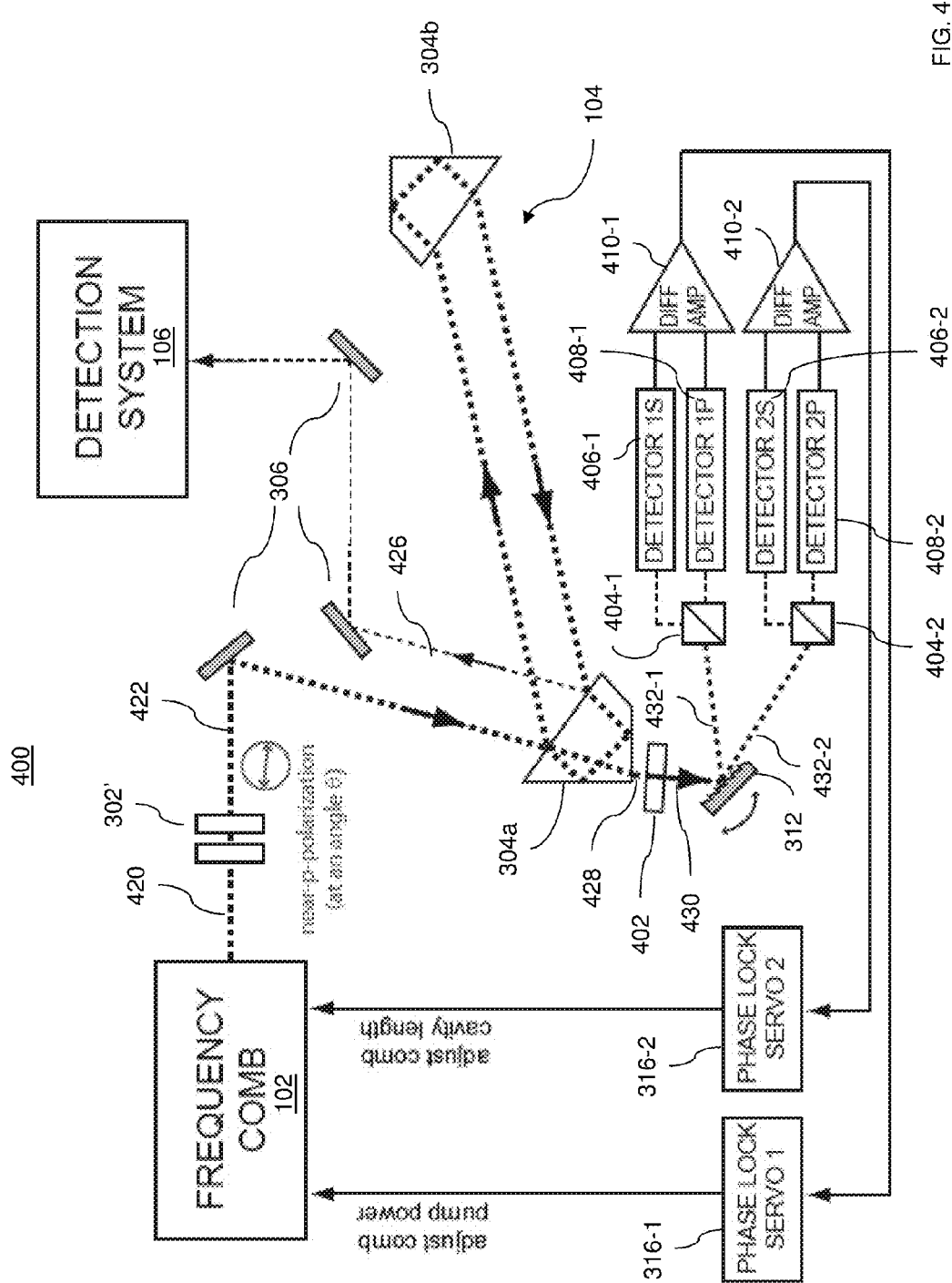
FIG. 4 is a functional block diagram illustrating an example spectroscopy system shown in FIG. 1 having an electronic locking scheme, according to another embodiment of the present invention.
Figure 5:
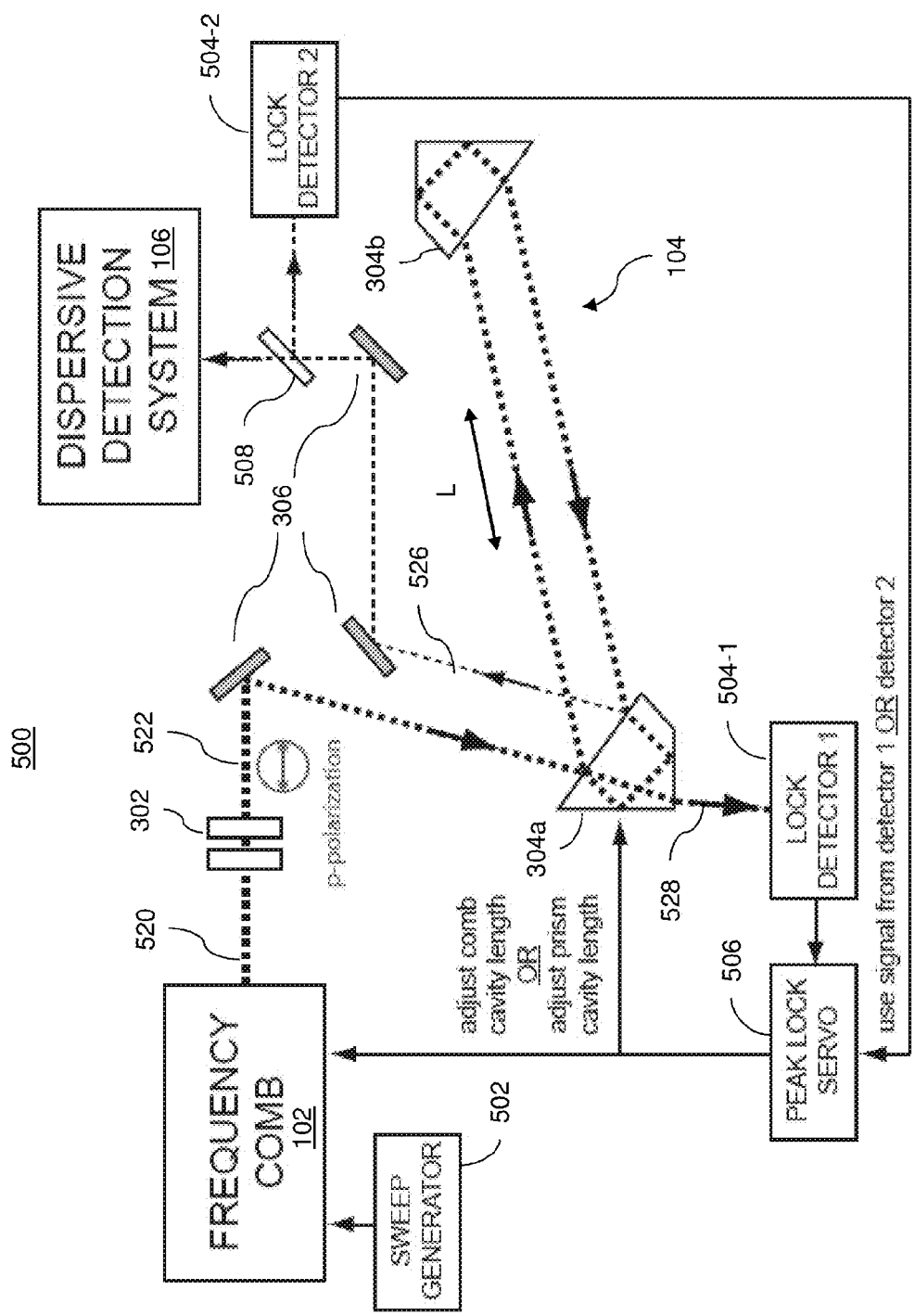
FIG. 5 is a functional block diagram illustrating an example spectroscopy system shown in FIG. 1 having a swept coupling scheme, according to an embodiment of the present invention.

Referring now to FIG. 1, an example prism cavity-enhanced spectroscopy system 100 is shown. System 100 includes frequency comb 102, prism cavity 104, detection system 106 and comb-cavity coupling system 108 (also referred to herein as coupling system 108). System 100 represents a CE-DFCS system using prism cavity 104. Although not shown in FIG. 1, system 100 may include additional optical elements, such as a polarizer (e.g., polarizer 302 shown in FIG. 3), steering optics (e.g., steering optics 306 shown in FIG. 3), a wave plate (e.g., quarter wave plate 402 shown in FIG. 4) and/or a dispersive element (e.g., grating 312 shown in FIG. 3). System 100 may also include additional electronic elements, as described further below with respect to comb-cavity coupling system 108 (FIGS. 3-5). Optical coupling between frequency comb 102, prism cavity 104, detection system 106 and comb-cavity coupling/locking system 108 may include free-space coupling and/or optical fiber coupling via any suitable optical elements.

In operation, frequency comb 102 generates light pulses that are directed toward prism cavity 104 using fiber-optics and/or free-space optics. The light pulses are optically coupled into prism cavity 104. As shown in FIG. 3, prism cavity 104 includes two retro-reflective prisms 304a, 304b that form a ring cavity. Incident light from frequency comb 102 undergoes internal reflections within prisms 304a, 304b. Some of the light (at one or more frequencies corresponding prism cavity modes of prism cavity 104) gets reflected between prisms 304a, 304b and resonates in prism cavity 104. A portion of the light reflected in prism cavity 104 exits prism cavity 104 and is directed (using fiber and/or free-space optics) to detection system 106. Detection system 106 detects an intensity of the light output from prism cavity 104 at one or more frequencies (also referred to herein as cavity transmission).

If a sample (not shown) is placed within prism cavity 104, light within prism cavity 104 interacts with the sample, allowing comb frequencies to be differentially absorbed by the sample according to the sample composition. Detection system 106 (or an analyzer coupled to detection system 106) may determine the composition of the sample from the measured cavity transmission, based on the absorption of light by the sample at one or more frequencies. For example, minimal intensity of the cavity transmission at particular frequencies may indicate absorption of the light at those frequencies by the sample. Detection system 106 (or an analyzer) may match the identified frequencies where absorption occurs to a predetermined sample composition (e.g., stored in a database).

Detection system 106 may include any suitable detector, for example, a non-dispersive detector, a dispersive detector or a Fourier transform detection system. In one example, a non-dispersive detector includes a single-channel photodetector for narrowband applications or slow tuning applications. A dispersive detector may include, for example, a monochromator, a diffraction grating, a virtually imaged phased array (VIPA) spectrometer, an Echelle spectrograph, or any other dispersive detection device in combination with a photodetector or array detector (e.g., a photodiode array or focal plane array) for measuring the cavity transmission at one or more frequencies, with a bandwidth and a resolution suitable for a specific application. In some examples, a Fourier detection system may include a scanning interferometer (e.g., used in current Fourier transform infrared spectrometers, as shown in Foltynowicz et al., Phys. Rev. Lett. 107, 233002 (2011)) or a dual comb approach (e.g., as described in B. Bernhard et al., Nat. Photon. 4, 55 (2010)). The use of a VIPA spectrometer is described in Thorpe et al., Appl. Phys. B 91, 397 (2008) or in Adler et al., Annu. Rev. Anal. Chem. 3, 175 (2010).

Frequency comb 102 is a laser source that emits broadband radiation, typically in short, regular pulses. Typical near infrared frequency combs emit spectra with bandwidths ranging from about several tens of nanometers to greater than about 1000 nm (when using nonlinear spectral broadening). As a consequence, the frequency-domain representation of the pulses includes a broadband overall spectral coverage, but with a regular, comb-like substructure of narrow spectral lines (hence, the name frequency comb). In the frequency domain, the frequency comb is characterized by two parameters: the laser repetition rate ($f_{rep}$) and the comb offset ($f_0$). The laser repetition rate ($f_{rep}$) is the rate at which light pulses are emitted from the laser (frequency comb 102) and which determines the spacing of the individual comb lines. The comb offset ($f_0$) is a parameter that determines the entire offset of frequency comb 102 from zero frequency to $f_{rep}$. Both parameters determine the frequency ($v_m$) of every comb line m via $v_m = f_0 + m f_{rep}$ (where m represents an integer). Examples of suitable laser sources for frequency comb 102 include, without being limited to, mode-locked titanium (Ti)-doped sapphire lasers (e.g., having a wavelength range of about 0.4-1.2 µm), Ytterbium (Yb)-doped femtosecond fiber lasers (e.g., having a wavelength range of about 0.6-1.5 µm) and Erbium (Er)-doped fiber (Er:fiber) lasers (e.g., having a wavelength range of about 1.0-2.2 µm). The wavelength ranges shown here as examples may be produced directly from the comb sources or via the inclusion of further elements (typically nonlinear optical elements) for frequency conversion or spectral broadening.

Referring briefly to FIG. 3, prism cavity 104 is a special form of an optical cavity including two retro-reflecting Brewster prisms 304a, 304b (instead of mirrors, which are typically used to form an optical cavity). Prisms 304a, 304b may be formed from any suitable optically transparent material such as, without being limited to, fused silica, sapphire, calcium fluoride, barium fluoride, zinc selenide and diamond. Prisms 304a and 304b are spaced apart by length L (also referred to as the cavity length) and optically aligned along an optical axis of the resonator, to form a ring cavity. Each prism 304a, 304b includes a plurality of total internal reflection surfaces. The optical path length ($L_{opt}$) through prism cavity 104 (for one round trip) may be defined as $L_{opt} = 2L + l_1 n_1 + l_2 n_2$, where $l_1$ is the path length inside prism 304a, $n_1$ the refractive index of prism 304a, $l_2$ is the path length inside prism 304b and $n_2$ is the refractive index of prism 304b.

The Brewster angle (also called the polarization angle) is an angle of incidence at which P-polarized light is entirely transmitted through a transparent dielectric material (such as glass), with no reflection at the surface. When unpolarized light is incident at this angle, a portion of the incident light is reflected from the surface, and a remaining portion is refracted into the material. The portion of light that is reflected from the surface is entirely S-polarized. The portion of light that is refracted includes P- and S-polarization components. Thus, for unpolarized light, the S-polarization component is only partially refracted in the material (with the remainder being reflected from the surface) and the P-polarization component is entirely refracted in the material. Thus, light that is transmitted through the material is partially polarized.

In operation, light 324 from frequency comb 102 is directed to prism cavity 104, to be incident on surface 305a of prism 304a via a small deviation (less than about a few degrees) from the Brewster angle (where the Brewster angle is relative to the normal of surface 305a). This results in a small but controlled reflection loss for optical radiation with P-polarization with respect to Brewster angle surface 305a. Surface 305b of prism 304b is also configured as a Brewster angle surface; positioned so that incident light and output light are directed at the Brewster angle (relative to the normal of surface 305b). Incident light 324 that is coupled into prism cavity 104 experiences total internal reflection bounces within each prism 304a, 304b, and is reflected between prisms 304a and 304b. Portion 326 of the light in prism cavity 104 exits surface 305a of prism 304a (at a different position on surface 305a than incident light 234). A portion of incident light 324 propagates through prism 304a (from surface 305a) and exits prism 304a through surface 307 as optical error signal 328. Optical error signal 328 may be used to control coupling between frequency comb 102 and prism cavity 104 (described further below with respect to FIGS. 3-5). By utilizing Brewster angles and total internal reflection, optical losses of prism cavity 104 may be kept at a minimum to allow for high cavity finesse. Optical losses of prism cavity 104 may only be limited by scattering due to surface quality and a manufacturing accuracy of the prism angles.

One characteristic of prism cavity 104 is that the optical beam path includes a significant portion of the prism material (typically about 2-10% of the entire optical path length). Therefore, dispersion is a major factor when operating prism cavity 104 with a broadband source such as frequency comb 102. Due to the dispersion, the FSR, which describes the distance of neighboring longitudinal cavity modes, is strongly frequency-dependent.

Figure 2A:
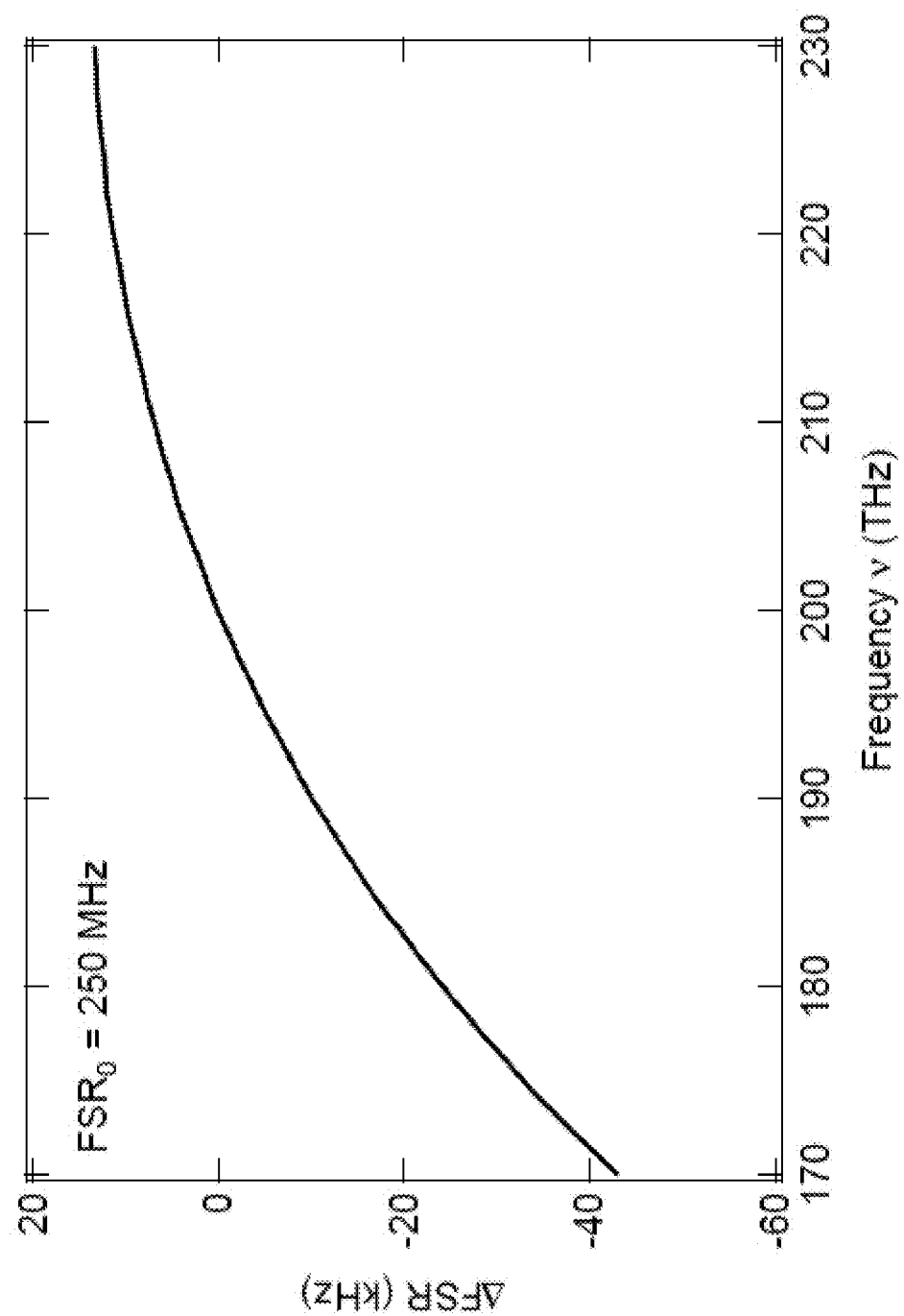
FIG. 2A is a graph illustrating a deviation from nominal FSR as a function of frequency for an example prism cavity.

FIG. 2A is a graph illustrating the dispersive properties of an example prism cavity 104. In such a high-dispersion cavity (i.e., prism cavity 104), the FSR may vary significantly with frequency. FIG. 2A illustrates the deviation of the cavity FSR from the nominal FSR in the near infrared spectra region versus the frequency of the light for fused silica prisms with a height of 20 mm (a typical material and size for prisms). The nominal cavity FSR is set to 250 MHz at a frequency of 200 THz, as an example.

Coupling system 108 (FIG. 1) is configured to manage the dispersion of prism cavity 104 and to use this dispersion, by optimizing the optical coupling between frequency comb 102 and prism cavity 104. Coupling system 108 is configured to receive at least one optical signal propagated through prism cavity 104 (such as optical error signal 328 in FIG. 3) and to adjust a characteristic(s) of frequency comb 102 and/or prism cavity 104. In some examples, coupling system 108 may lock a frequency comb mode of frequency comb 102 to a particular prism cavity mode of prism cavity 104, described further below with respect to FIGS. 3, 4 and 7A-7C (i.e., a locking scheme). In some examples, coupling system 108 may dynamically adjust the frequency comb line spacing of frequency comb 102 to the FSR of prism cavity 104 (or dynamically adjust the cavity length of prism cavity 104 to the FSR of frequency comb 102), described further below with respect to FIG. 5 and FIGS. 8A-8D (i.e., a swept coupling scheme).

The coupling of frequency comb 102 to prism cavity 104 is further described with reference to FIG. 2B. In particular, FIG. 2B is a graph illustrating an example accumulated mode detuning as a function of frequency for an example prism cavity.

For general understanding, a static picture is considered where the repetition rate $f_{rep}$ of frequency comb 102 is adjusted to 250 MHz to match the nominal FSR of prism cavity 104. This way, optimum coupling may occur around 200 THz, where the FSR matches the $f_{rep}$ of frequency comb 102. By integrating the FSR detuning in both directions from the optimum coupling, an accumulated detuning of the cavity modes versus the equidistant comb lines can be calculated.

Figure 2B:
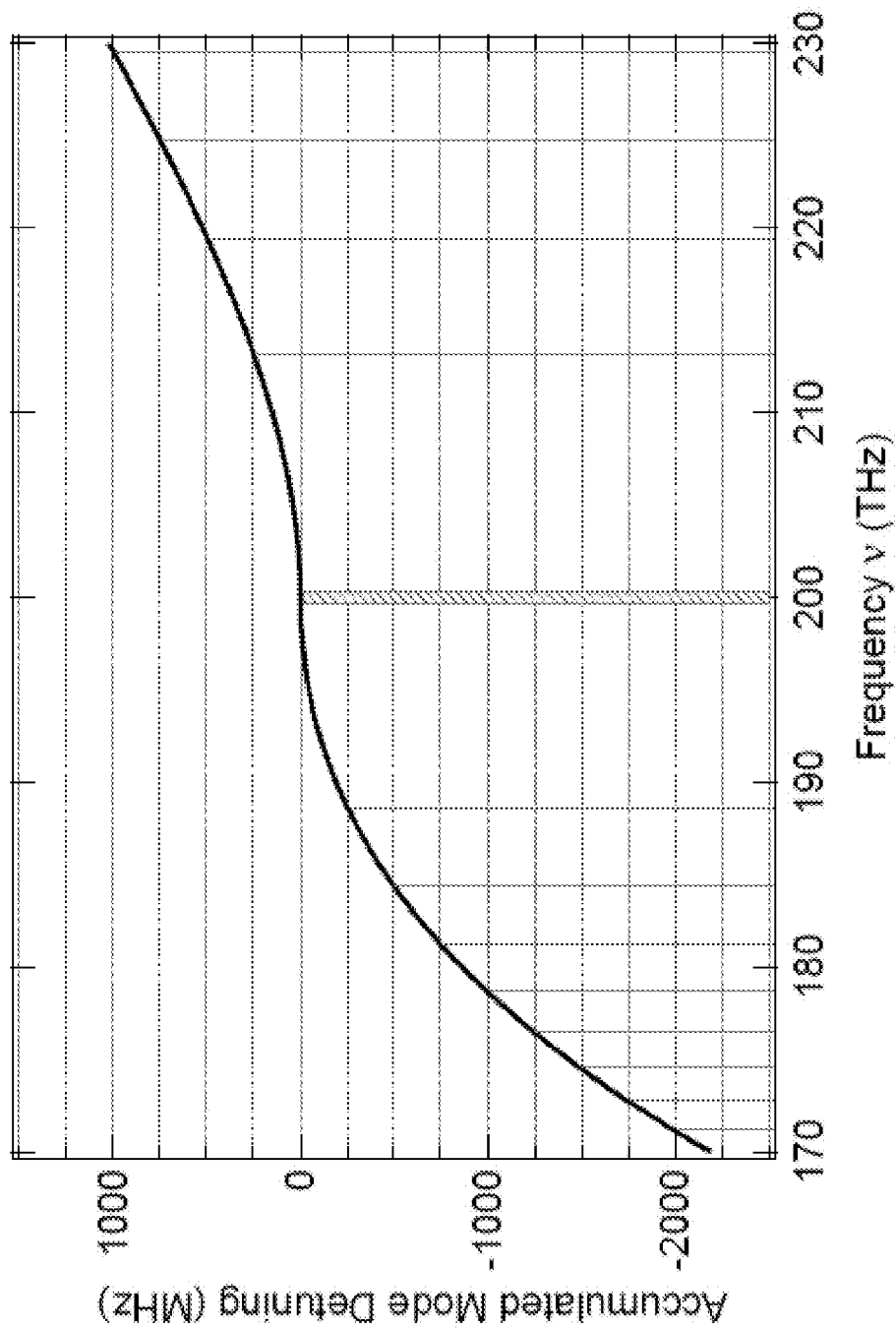
FIG. 2B is a graph illustrating an example of accumulated mode detuning as a function of frequency for an example prism cavity.

The result is depicted in FIG. 2B over the same frequency band as in FIG. 2A. The grid lines indicate the frequency comb $f_{rep}$ of 250 MHz. To obtain the spectral bandwidth that can be coupled simultaneously into prism cavity 104 in this static picture, the linewidth of cavity 104 and the linewidth of the comb lines of frequency comb 102 should be considered. Assuming a cavity finesse of $10^6$, the cavity linewidth is equal to 2.5 kHz. A typical linewidth of a near-infrared frequency comb 102 such as an Er:fiber laser is on the order of 100 kHz, and therefore much larger than the cavity linewidth. As a result, the coupling bandwidth is mainly determined by the linewidth of frequency comb 102.

To estimate the coupling bandwidth, it is assumed that light will be coupled into prism cavity 104 when the detuning between the cavity modes and the comb lines exceeds the 100 kHz linewidth (of frequency comb 102). Based on FIG. 2B, ±100 kHz detuning is achieved when the frequency changes by ±90 GHz. Therefore, the total coupling bandwidth will be 180 GHz, which is equal to 1.35 nm in wavelength (at a center frequency of 200 THz). This calculation shows that, due to its large dispersion, prism cavity 104 (or any high-dispersion cavity) will act as an effective wavelength filter with a resolution of about 1 nm around the optimum coupling region, indicated as the shaded box in FIG. 2B. This resolution can be scaled to lower or higher numbers by increasing or decreasing the cavity dispersion, e.g., by using smaller or larger prisms or choosing a higher or lower dispersion material.

FIG. 2B also illustrates another effect of the high dispersion of prism cavity 104. When the detuning reaches a multiple of the comb $f_{rep}$, the $n^{th}$ prism cavity mode will again overlap with a comb line. In other words, depending on dispersion direction, either the $(m-x)^{th}$ or $(m+x)^{th}$ line will overlap, with x representing an integer greater than or equal to 1. This is known as the Vernier effect. The Vernier effect allows additional coupling into the cavity at one or more frequencies far away from the actually optimized coupling frequency. In FIG. 2B, the vertical lines indicate these Vernier transmission regions. The coupling bandwidth of these regions is much smaller than the one in the optimized region, as indicated by the increased slope of the curve shown in FIG. 2B. In some examples, the Vernier effect may be used in case a resolution of less than about 1 nm is desirable and changes to the physical size or material of the prisms 304 (FIG. 3) is not desirable or possible. In addition, if a coarsely dispersive detection system 106 is used (such as a grating or monochromator), these Vernier transmission lines can be used as frequency markers to obtain a broadband measurement, even in a static coupling configuration.

Although 1 nm resolution is typically not sufficient for high-precision spectroscopy of light molecules, the resolution is sufficient for the detection of liquids or more complex molecules with broadband absorption features. Tuning may be achieved by changing the $f_{rep}$ of frequency comb 102. Due to the Vernier coupling effect, the entire bandwidth of prism cavity 104 may be covered by tuning the optical frequency only by a fraction of the entire frequency band. By mapping the frequency positions of the Vernier regions, the dispersion of prism cavity 104 may be determined (described in Thorpe et al., Opt. Express 13, 882 (2005)). When using a single-channel detector for detection system 106, the detection bandwidth may be selected to prevent any unwanted interference with the Vernier regions. In FIG. 2B, for example, this range extends to >20 THz, which is sufficient for many experiments.

Next, examples of frequency comb-prism cavity coupling techniques provided by coupling system 108 (FIG. 1) are described for static and dynamic coupling. In some examples, coupling system 108 may include optical and/or electronic components for static coupling of prism cavity 104 to frequency comb 102 via any suitable electronic locking scheme (such as described further below in FIGS. 3, 4 and 7A-7C). In some examples, coupling system 108 may include optical and/or electronic components for dynamic coupling via a swept coupling scheme (as described further below with respect to FIGS. 5 and 8A-8D).

Referring to FIGS. 7A-7C, electronic locking for static coupling is described. In particular, FIG. 7A is a graph illustrating an example of prism cavity modes as a function of frequency for a locked coupling scheme; FIG. 7B is a graph illustrating an example of frequency comb modes as a function of frequency for the locked coupling scheme; and FIG. 7C is a graph illustrating an example of comb frequency domain spectrum 706 and cavity transmission frequency domain spectrum 708 when prism cavity mode n (in frequency region 702) is matched (and locked) to frequency comb mode m via electronic locking.

In static coupling, the comb line spacing of frequency comb 102 and the FSR of prism cavity 104 are locked into a static position. For example, cavity mode n of prism cavity 104 is matched (aligned with) frequency comb mode m of frequency comb 102. Thus, in frequency region 702 (where the comb and cavity modes are aligned), cavity transmission 708 is maximum. In frequency regions 700 and 704, the comb and cavity modes are misaligned, and cavity transmission 708 is reduced. As shown in FIG. 7C, the locked coupling scheme provides maximum transmission of a narrow, desired spectral region (e.g., region 702) (compared to comb frequency domain spectrum 706). Accordingly, comb-cavity coupling system 108 (FIG. 1) configured for static coupling operates as a band pass spectral filter. It emphasizes optimum coupling in a very narrow region of the spectrum. Therefore, in the region where comb lines and cavity modes are matched up, high transmission may be produced (i.e., transmission comparable to the input comb frequency domain spectrum 706) at the expense of smaller spectral bandwidth coverage.

To use a static coupling scheme, electronic locking is applied to frequency comb 102, to compensate for jitter and drift typically caused by vibrations and thermal fluctuations of both frequency comb 102 and prism cavity 104. Two examples of electronic locking schemes include the Pound-Drever-Hall (PDH) technique (described in Drever et al., Appl. Phys. B 31, 97 (1983)) and the Hänsch-Couillaud (HC) technique (described in Hänsch et al., Opt. Comm. 35, 441 (1980)). Both techniques rely on generating an electronic error signal, by taking advantage of the discriminatory behavior of an on- or off-resonant optical cavity; either through phase modulation (PDH) or polarization (HC). FIG. 3 is a block diagram of example prism cavity-enhanced spectroscopy system 300 implementing PDH locking between frequency comb 102 and prism cavity 104. FIG. 4 is a block diagram of example prism cavity-enhanced spectroscopy system 400 implementing HC locking between frequency comb 102 and prism cavity 104.

Referring now to FIG. 3, example system 300 using PDH locking is shown. System 300 includes frequency comb 102, polarizer 302, prism cavity 104, steering optics 306, detection system 106, frequency generator 308, electro-optic modulator (EOM) 310, dispersive element 312, lock detectors 314-1, 314-2, and phase lock servo mechanisms (servos) 316-1, 316-2. Polarizer 302, frequency generator 308, EOM 310, dispersive element 312, lock detectors 314 and phase lock servos 316 represent coupling system 108 (FIG. 1). In system 300, polarizer 302 is configured to provide P-polarization. Polarizer 302 may be formed from any suitable optical filter configured to pass P-polarization and block S-polarization. Dispersive element 312 may include any suitable optically dispersive element, such as a diffraction grating.

In operation, frequency comb 102 generates incident light pulses 320 (which may be representative in the frequency domain as comb components). Incident light 320 is polarized by polarizer 302 to form P-polarized light 322. P-polarized light 322 is phase modulated by EOM 310 to form phase modulated light 324. Phase modulated light 324 may include polarized light 322 (associated with frequency comb 102), as well as two sidebands for each frequency comb line.

Frequency generator 308 generates the frequency of the two sidebands, which may be provided to EOM 310 or to frequency comb 102. In one example, EOM 310 may phase-modulate polarized light 322 to produce sidebands based on the frequency provided by frequency generator 308. In another example, phase modulation may be produced directly at frequency comb 102 (without using EOM 310), based on the frequency provided by frequency generator 308.

Phase modulated light 324 is coupled into prism cavity 104 and propagates in prism cavity 104, interacting with any test sample (not shown) in prism cavity 104 for many round-trips. Prism cavity 104 allows a portion of the intra-cavity beam to exit retro-reflecting prism 304a, as cavity output light 326. Cavity output light 326 may be directed to detection system 106 via steering optics 306 (e.g., one or more mirrors). A portion of phase modulated light 324 is passed through prism 304a and output as optical error signal 328.

Detection system 106 may be configured to detect a cavity transmission from cavity output light 326. Detection system 106 may include, for example, a single channel detector, a dispersive detection system or a Fourier transform detection system.

Optical error signal 328 is diffracted by dispersive element 312 into first and second diffraction signals 330-1 and 330-2 associated with different frequencies of frequency comb 102. First diffraction signal 330-1 is associated with a frequency corresponding to comb offset $f_0$. Second diffraction signal 330-2 is associated with a frequency corresponding to repetition rate $f_{rep}$. Diffraction signals 330-1, 330-2 are coupled to respective lock detectors 314-1, 314-2. Based on first diffraction signal 330-1, lock detector 314-1 controls phase lock servo 316-1 to adjust a comb pump power of frequency comb 102. Based on second diffraction signal 330-2, lock detector 314-2 controls phase lock servo 316-2 to adjust a comb cavity length of frequency comb 102.

In general, optical error signal 328 includes the generated sidebands, and the carrier offset and repetition rate components of frequency comb 102, which may be phase shifted due to transmission through prism 304a. Each lock detector 314 determines how far the respective comb offset and repetition rate is off resonance with the cavity 104 and may be used as feedback for active stabilization.

The PDH locking provided by system 300 is different from a PDH lock between a continuous-wave laser and a mirror cavity. Because frequency comb 102 is determined by two parameters, $f_{rep}$ and $f_0$, the lock involves two different spectral regions inside the comb spectrum to generate feedback signals for both variables. Then, $f_{rep}$ is typically controlled via the comb oscillator length, while $f_0$ control is typically exercised through the adjustment of the oscillator pump laser current. Such a scheme was, for instance, employed in the work of Foltynowicz et al., Phys. Rev. Lett. 107, 233002 (2011).

Another parameter of interest in system 300 is the extraction of the appropriate optical error signal 328. In a mirror cavity, the reflection from the input mirror is used to extract the phase shift signals of the laser line and the sidebands added through an EOM. With prism cavity 104, the error signal is equivalent to the beam transmitted through the input coupling prism and output from surface 307.

Referring next to FIG. 4, an example system 400 using HC locking is shown. System 400 includes frequency comb 102, polarizer 302', prism cavity 104, steering optics 306, detection system 106, quarter wave plate 402, dispersive element 312, beam splitters 404-1, 404-2, S-polarization detectors 406-1, 406-2, P-polarization detectors 408-1, 408-2, differential amplifiers 410-1, 410-2 and phase lock servos 316-1, 316-2. In system 400, polarizer 302' is configured to provide near-P-polarization, with a deviation angle θ from complete P-polarization. This angle provides a small S-component to the polarization. The optimum fraction of this component is system dependent and may be found by optimizing the error signal. In system 400, polarizer 302', quarter wave plate 402, dispersive element 312, beam splitters 404, S-component detectors 406, P-component detectors 408, differential amplifiers 410 and phase lock servos 316 represent coupling system 108 (FIG. 1).

In operation, frequency comb 102 generates incident light pulses 420 (which may be representative in the frequency domain as comb components). Incident light 420 is polarized by polarizer 302' to form near-P-polarized light 422.

Polarized light 422 is coupled into prism cavity 104 and propagates in prism cavity 104, interacting with any test sample (not shown) in prism cavity 104. Prism cavity 104 allows a portion of the intra-cavity beam to exit retro-reflecting prism 304a, as cavity output light 426. Cavity output light 426 may be directed to detection system 106 via steering optics 306. A portion of polarized light 422 is passed through prism 304a and output as optical error signal 428. Detection system 106 may be configured to detect a cavity transmission from cavity output light 426. Detection system 106 may include, for example, a single channel detector, a dispersive detection system or a Fourier transform detection system.

Optical error signal 428 is transformed into elliptically polarized light by quarter wave plate 402. Elliptically polarized signal 430 is diffracted by dispersive element 312 into first and second diffraction signals 432-1 and 432-2 associated respectively with comb offset $f_0$ repetition rate $f_{rep}$ (as described above with respect to FIG. 3). Each diffraction signal 432 is split by respective polarizing beamsplitter 404 and provided to S-component detector 406 and P-component detector 408. S-component and P-component detectors 406, 408 identify a change in the amount of S- and P-polarization in diffraction signal 432 (caused by polarization from prism 304a), as compared to incident polarized light 422 from frequency comb 102. Each differential amplifier 410 uses a difference in the detected S and P polarization (received from detectors 406, 408) in order to generate an electronic error signal and control respective phase lock servos 316. The output of differential amplifier 410-1 may be used by phase lock servo 316-1, to adjust the comb pump power of frequency comb 102. The output of differential amplifier 410-2 may be used by phase lock servo 316-2, to adjust a comb cavity length of frequency comb 102.

The HC locking provided by system 400 is different from an HC lock between a continuous-wave laser and a mirror cavity. In contrast to a mirror cavity, no additional polarizing element is added to prism cavity 104, as prisms 304 themselves act as strong polarizers. As in the PDH scheme (FIG. 3), two feedback signals at different spectral regions are obtained to provide feedback to control the comb offset and repetition rate of frequency comb 102. In both the PDH scheme (FIG. 3) and HC scheme (FIG. 4), scanning or tuning of the coupled light spectrum can be performed by rotating the dispersive element 312 (indicated by the double-headed arrow) that determines the two lock points.

Referring next to FIGS. 8A-8D, a swept coupling scheme (dynamic coupling) is described. In particular, FIG. 8A is a graph illustrating an example of prism cavity modes as a function of frequency for a swept coupling scheme; FIG. 7B is a graph illustrating an example of frequency comb modes as a function of frequency for the swept coupling scheme; FIG. 8C is a graph illustrating an example of frequency comb sweep signal 802 and prism cavity transmission signal 804 as a function of time for the swept coupling scheme; and FIG. 8D is a graph illustrating an example of comb frequency domain spectrum 806 and cavity transmission frequency domain spectrum 808 for dynamic coupling.

In the swept coupling scheme, a rapid linear sweep 802 of repetition rate $f_{rep}$ of frequency comb 102 (or, alternatively, the FSR of prism cavity 104) allows matching of the comb's $f_{rep}$ and the cavity's FSR for all spectral regions at some point during the sweep (as shown in FIG. 8C). Therefore, transient coupling is achieved for a wide spectral bandwidth. However, a coupling efficiency may be reduced during the sweep, resulting in a lower overall transmission 808 through the prism cavity (compared to the input comb frequency domain spectrum 806).

As shown in FIG. 8D, the swept coupling scheme may maximize the overall transmitted bandwidth, by dynamically changing the spacing of either frequency comb 102 or cavity lines (by changing the length of prism cavity 104). When performing a linear sweep 802, different spectral regions will be transmitted through prism cavity 104 at different times. If the sweep 802 is fast compared to the acquisition time of detection system 106, on average, a full spectrum may be transmitted. If the sweep 802 is slow compared to the acquisition speed of detection system 106, different transmission spectra may be observed over time, allowing, for instance, moderate spectral resolution when used with a single-channel detector 106.

Referring next to FIG. 5, example prism cavity-enhanced spectroscopy system 500 using a swept coupling scheme is shown. System 500 includes sweep generator 502, frequency comb 102, polarizer 302, prism cavity 104, steering optics 306, dispersive detection system 106, lock detectors 504-1, 504-2, beam splitter 508 and peak lock servo 506. In system 500, polarizer 302 provides p-polarization. In system 500, sweep generator 502, lock detectors 504 and peak lock servo 506 form coupling system 108 (FIG. 1).

In operation, sweep generator 502 generates a sweep signal 602 over a predetermined period of time (shown in FIG. 6A) that is applied to frequency comb 102, to sweep the repetition rate $f_{rep}$ of frequency comb 102 over a predetermined range of frequencies. Thus, system 500, instead of coupling and analyzing a fixed portion of the spectrum of frequency comb 102 at the same time, transmits one comb frequency at a time through prism cavity 104. The light from frequency comb 102 (represented generally as incident light 520) is polarized by polarizer 302 to form P-polarized light 522.

Polarized light 522 is coupled into prism cavity 104 and propagates in prism cavity 104, as described above. Prism cavity 104 allows a portion of the intra-cavity beam to exit retro-reflecting prism 304a, as cavity output light 526. Cavity output light 526 may be directed to dispersive detection system 106 via steering optics 306. A portion of polarized light 522 is passed through prism 304a and output as optical error signal 528.

Figure 6B:
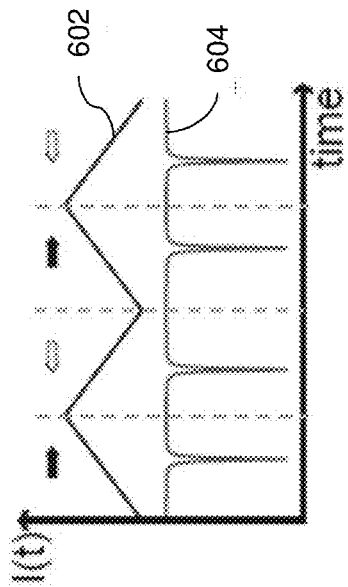
FIGS. 6A, 6B and 6C are graphs illustrating respective sweep and lock detector output signals of the system shown in FIG. 5, according to an embodiment of the present invention.
Figure 6C:
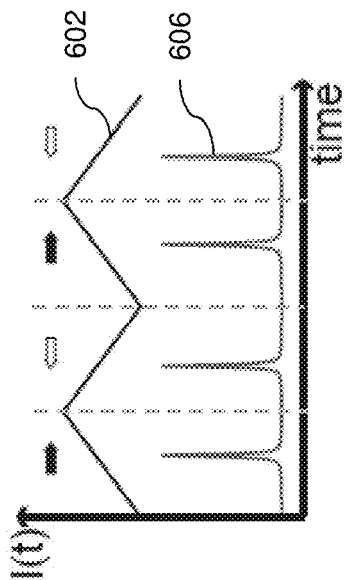
Figure 6A:
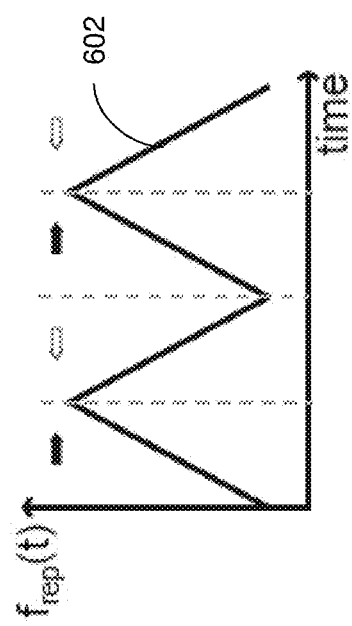

Optical error signal 528 is directed to first lock detector 504-1. Signal 604 from first lock detector 504-1 is shown in FIG. 6B. Alternatively, cavity output light 526 is directed to second lock detector 504-2 via beamsplitter 508. Signal 606 from second lock detector 504-2 is shown in FIG. 6C. Lock detector 504-1 detects a lower signal 528 when frequency comb 102 is resonant with prism cavity 104. Lock detector 504-2 detects a higher signal 526 when frequency comb 102 is resonant with prism cavity 104. Based on output signal 604 from first lock detector 504-1 or output signal 606 from second lock detector 504-2, peak lock servo 506 adjust a comb cavity length of frequency comb 102 or a cavity length of prism cavity 104.

In system 500, the matching between the cavity modes and the comb frequencies is manipulated to allow only a very narrow band of frequencies (one or a few comb frequencies) to propagate through prism cavity 104 at a certain time. Then, either prism cavity 104 or frequency comb 102 is changed dynamically, and different comb frequencies are coupled into the cavity 104. Due to the rapid sweeping of the repetition rate, system 500 walks through a range of frequencies, outputting successive cavity output light 526 at each frequency, so that the entire spectrum is sampled rapidly one comb component at a time.

In system 500, the repetition rate frequency $f_{rep}$ of frequency comb 102 may be purposely detuned from the FSR of prism cavity 104. Frequency $f_{rep}$ is then swept in a controlled manner such that successive frequencies come into resonance with prism cavity 104 at successive times. The successive frequencies are then detected in cavity output signal 526 and/or optical error signal 528, one at a time, by respective lock detectors 504-1, 504-2.

Because of the highly dispersive properties of prism cavity 104, static coupling (such as shown in FIGS. 3 and 4) may provide band pass spectral filtering (as opposed to continuous broadband spectral coverage). The swept coupling provided by system 500, may overcome the high dispersion limitations of prism cavity 104, by applying a repeated rapid linear sweep 602 (such as in form of a triangle waveform) to the length of the frequency comb 102, thereby modulating $f_{rep}$. The sweep signal 602 may also be applied to the length of prism cavity 104, thereby modulating the FSR. In some examples, length modulation of frequency comb 102 may performed using a small piezo-electric element or fiber stretcher. In some examples, it may be more convenient (e.g., faster) to modulate the length of frequency comb 102 than to adjust the length of prism cavity 104, because of the physical size of prisms 304.

With low-dispersion cavities, the sweep may be performed with minimal amplitude to cover the entire desired detection bandwidth. With high dispersion prism cavity 104, the change in FSR may be quite significant over the entire spectrum to be covered, typically a factor of $10^3$ to $10^4$ larger than for a mirror cavity. To cover the full frequency range shown in FIG. 2A (i.e., 170 to 230 THz) in one sweep, a change in $f_{rep}$ of about 50 kHz would be used. This corresponds to a change of about 40 GHz ($8 \times 10^5 \cdot 50$ kHz) in the optical comb line frequency around 200 THz. Depending on detection system 106, the full sweep amplitude may not be necessary.

Dispersive detection system 106 may include a grating monochromator for low resolution detection, a VIPA spectrometer or an Echelle spectrograph for high-resolution in combination with a photodetector or array detector (e.g., a photodiode array or focal plane array). Echelle spectrographs have been widely used in astronomy and are described, for instance, in Hinkle et al., Proc. SPIE 91514A (2014). Using a monochromator or a VIPA spectrometer with an array detector and appropriate imaging components, concurrent detection bandwidths of 5-10 THz in the near-IR may be obtained. According to FIG. 2B, this corresponds to an approximate change in FSR of about 5-10 kHz or a change in optical comb frequency of about 4-8 GHz.

To choose the optimum sweep speed, three criteria may be considered: the relationship between sweep speed and cavity lifetime, low-frequency noise and the coupling efficiency. The lifetime of the cavity 104 is typically greater than about 10 µs. To sweep a 100-kHz-wide comb line across a cavity mode in that time would correspond to a sweep rate β of 10 GHz/s. If β<<10 GHz/s, the system operates in a quasi-static mode resembling cavity-enhanced absorption spectroscopy. If β>>10 GHz/s, the system operates in a more dynamic mode resembling cavity ring-down spectroscopy. The properties of the two different regimes are detailed in Thorpe at al., Appl. Phys. B 91, 397 (2008).

For swept coupling, the sweep rate is typically in the dynamic regime, taking advantage of low-frequency noise suppression. A higher sweep rate may suppress more noise and allow for a faster measurement time. However, if the sweep rate is too high, the light will not be able to spend enough time on the cavity resonance to sufficiently excite the respective cavity mode. In this case, further increasing the sweep rate will be associated with a loss in signal-to-noise ratio. The optimum sweep rate may be selected based on the cavity finesse, the comb linewidth, and/or the detector signal-to-noise ratio. For example, an initial sweep rate (such as 10 GHz/s) may be selected and the sweep rate increased until an optimum sweep rate for system 500 is determined. The total measurement time for a full spectrum may then depend on the sweep rate and the total bandwidth may be covered. As an example, for a sweep rate of 100 GHz/s, it may take about 40-80 ms to cover a bandwidth of 5-10 THz of optical frequency. Therefore, a measurement rate greater than 10 Hz may be easily obtained.

Although the invention is illustrated and described herein with reference to specific embodiments, the invention is not intended to be limited to the details shown. Rather, various modifications may be made in the details within the scope and range of equivalents of the claims and without departing from the invention.

What is claimed:

1. A spectroscopy system comprising:
a light source configured to generate light corresponding to a frequency comb;
a prism cavity optically coupled to the light source, the prism cavity configured to receive the generated light and to produce first output light and second output light, the first output light associated with reflection of the received light within the prism cavity, the second output light associated with transmission of the received light through a prism of the prism cavity; and
a coupling system coupled to the light source and the prism cavity, the coupling system configured to adjust a characteristic of at least one of the light source or the prism cavity, based on at least one of the first output light and the second output light, the characteristic adjusted to increase optical coupling between the light source and the prism cavity and compensate for a dispersion of the prism cavity.

2. The system of claim 1, further including a detector optically coupled to the prism cavity, the detector configured to measure a cavity transmission of the first output light from the prism cavity.

3. The system of claim 2, wherein the detector includes at least one of a non-dispersive detector, a dispersive detector or a Fourier transform detector.

4. The system of claim 3, wherein the dispersive detector includes at least one of a monochromator, a diffraction grating, a virtually imaged phased array spectrometer or an Echelle spectrograph.

5. The system of claim 1, further comprising a polarizer having a predetermined polarization characteristic disposed between the light source and the prism cavity.

6. The system of claim 1, wherein the characteristic includes at least one of a comb cavity length of the frequency comb, a pump power of the light source or a cavity length of the prism cavity.

7. The system of claim 1, wherein the coupling system is configured to statically couple a comb frequency mode of the frequency comb to a prism cavity mode of the prism cavity based on the second output light from the prism cavity.

8. The system of claim 7, wherein the coupling system is configured to statically couple the comb frequency mode to the prism cavity mode based on at least one of phase modulation locking or polarization locking.

9. The system of claim 7, wherein the coupling system includes:
a first detector configured to monitor a first frequency of the second output light, the first frequency associated with an offset of the frequency comb; and
a second detector configured to monitor a second frequency of the second output light, the second frequency associated with a repetition rate of the frequency comb, the monitored first frequency and the monitored second frequency used to adjust the characteristic of the light source.

10. The a system of claim 1, wherein the coupling system is configured to:
dynamically couple comb frequencies of the frequency comb to prism cavity modes of the prism cavity, by sequentially sweeping the comb frequencies over a predetermined period of time, and
adjust the characteristic of at least one of the light source or the prism cavity, for each comb frequency in the predetermined period of time, based on at least one of the first output light or the second output light.

11. The system of claim 1, wherein the prism cavity includes the prism and a further prism spaced apart by a cavity length, the prism and the further prism configured to form a ring cavity.

12. The system of claim 11, wherein the prism and the further prism each includes a Brewster angle retro-reflecting prism.

13. The system of claim 1, wherein the spectroscopy system is a cavity-enhanced direct frequency comb spectroscopy (CE-DFCS) system.

14. A method of comb-based spectroscopy, the method comprising:
generating, by a light source, light corresponding to a frequency comb;
directing the generated light to a prism cavity, such that the prism cavity produces first output light and second output light, the first output light associated with reflection of the generated light within the prism cavity, the second output light associated with transmission of the generated light through a prism of the prism cavity; and
adjusting a characteristic of at least one of the light source or the prism cavity, based on at least one of the first output light and the second output light, the characteristic adjusted to increase optical coupling between the light source and the prism cavity and compensate for a dispersion of the prism cavity.

15. The method of claim 14, wherein the characteristic includes at least one of a comb cavity length of the frequency comb, a pump power of the light source or a cavity length of the prism cavity.

16. The method of claim 14, wherein the adjusting of the characteristic includes:
dynamically coupling comb frequencies of the frequency comb to prism cavity modes of the prism cavity, by sequentially sweeping the comb frequencies over a predetermined period of time; and
adjusting the characteristic of at least one of the light source or the prism cavity, for each comb frequency in the predetermined period of time, based on at least one of the first output light or the second output light.

17. The method of claim 14, wherein the adjusting of the characteristic includes statically maintaining a match between a comb frequency mode of the frequency comb and a prism cavity mode of the prism cavity based on the second output light from the prism cavity.

18. The method of claim 17, wherein the adjusting of the characteristic includes:
monitoring a first frequency of the second output light, the first frequency associated with an offset of the frequency comb;
monitoring a second frequency of the second output light, the second frequency associated with a repetition rate of the frequency comb; and
adjusting the characteristic of the light source based on the monitored first frequency and the monitored second frequency.

19. The method of claim 14, the method further comprising measuring a cavity transmission of the first output light from the prism cavity.

20. The method of claim 14, wherein the prism cavity includes the prism and a further prism spaced apart by a cavity length, the prism and the further prism configured to form a ring cavity.

* * * * *

UNITED STATES PATENT AND TRADEMARK OFFICE
CERTIFICATE OF CORRECTION

Page 1 of 1

PATENT NO. : 9,207,121 B2
APPLICATION NO. : 14/482469
DATED : December 8, 2015
INVENTOR(S) : Adler It is certified that error appears in the above-identified patent and that said Letters Patent is hereby corrected as shown below:

In the specification

Column 12, line 10, "Fig. 78" should read -- "Fig. 7B" --

Signed and Sealed this
Twenty-ninth Day of March, 2016

Michelle K. Lee
*Director of the United States Patent and Trademark Office*